United States Patent
Myers et al.

(10) Patent No.: US 11,321,443 B2
(45) Date of Patent: May 3, 2022

(54) PASSWORD RESETTING SYSTEM AND METHOD

(71) Applicant: EMC IP Holding Company, LLC, Hopkinton, MA (US)

(72) Inventors: Jackson B. Myers, Cary, NC (US); Charles W. Kaufman, Redmond, WA (US); Gregory W. Lazar, Upton, MA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 313 days.

(21) Appl. No.: 16/178,904

(22) Filed: Nov. 2, 2018

(65) Prior Publication Data

US 2020/0143034 A1 May 7, 2020

(51) Int. Cl.
*G06F 21/45* (2013.01)
*G06F 21/30* (2013.01)

(52) U.S. Cl.
CPC ............ *G06F 21/45* (2013.01); *G06F 21/305* (2013.01); *G06F 2221/2137* (2013.01)

(58) Field of Classification Search
CPC . G06F 21/305; G06F 21/45; G06F 2221/2137
USPC .......................................................... 726/6
See application file for complete search history.

(56) References Cited

U.S. PATENT DOCUMENTS

| | | | | |
|---|---|---|---|---|
| 7,383,575 B2* | 6/2008 | Cheston | ................. | G06F 21/31 713/1 |
| 7,774,829 B2* | 8/2010 | Waltermann | ............ | G06F 21/31 726/6 |
| 8,584,222 B2* | 11/2013 | Hofer | ...................... | G07C 9/23 726/9 |
| 9,485,655 B1* | 11/2016 | Pirrotta | ............. | H04W 12/0608 |
| 2002/0065913 A1* | 5/2002 | Harrington | ............. | H04L 63/20 709/225 |
| 2003/0070102 A1* | 4/2003 | Kondo | .................... | G06F 21/31 726/23 |
| 2003/0081621 A1* | 5/2003 | Godfrey | .................. | H04L 63/20 370/400 |
| 2008/0120508 A1* | 5/2008 | Marconi | ................. | G06F 21/34 713/184 |
| 2010/0235897 A1* | 9/2010 | Mason | ................ | H04L 63/0846 726/7 |
| 2012/0311683 A1* | 12/2012 | Klein | ...................... | H04L 63/20 726/6 |
| 2016/0212141 A1* | 7/2016 | Banerjee | ............. | H04W 12/082 |
| 2018/0352312 A1* | 12/2018 | Kwon | ................... | H04W 76/14 |

OTHER PUBLICATIONS

NPL Search Results (Year: 2020).*
(Continued)

*Primary Examiner* — Syed A Zaidi
(74) *Attorney, Agent, or Firm* — Brian J. Colandreo; Mark H. Whittenberger; Holland & Knight LLP

(57) ABSTRACT

A method, computer program product, and computing system for coupling password-resetting content to an IT computing device. The password-resetting content is validated on the IT computing device. The password-resetting content is processed to reset one or more passwords associated with the IT computing device.

15 Claims, 3 Drawing Sheets

(56) References Cited

OTHER PUBLICATIONS

Hughes, Gordon F., and Joseph F. Murray. "Reliability and security of RAID storage systems and D2D archives using SATA disk drives." ACM Transactions on Storage (TOS) 1.1 (2005): 95-107. (Year: 2005).*
NPL Search Results (Year: 2021).*
NPL Search Terms (Year: 2021).*

* cited by examiner

FIG. 2A (front view)

PASSWORD RESETTING SYSTEM AND METHOD

TECHNICAL FIELD

This disclosure relates to storage management systems and, more particularly, to systems and methods for resetting passwords within storage management systems.

BACKGROUND

Storing and safeguarding electronic content is of paramount importance in modern business. Accordingly, various methodologies may be employed to protect and distribute such electronic content within storage management systems. In order to provide the requisite level of security with respect to such electronic content, password-protected user accounts may be utilized to gain access to such storage management systems (and the electronic content contained therein). Unfortunately, staff changes often occur and passwords are often forgotten/lost, resulting in lack of access and the complications related thereto.

SUMMARY OF DISCLOSURE

In one implementation, a computer-implemented method is executed on a computing device and includes coupling password-resetting content to an IT computing device. The password-resetting content is validated on the IT computing device. The password-resetting content is processed to reset one or more passwords associated with the IT computing device.

One or more of the following features may be included. Coupling password-resetting content to the IT computing device may include physically coupling password-resetting content to the IT computing device. Coupling password-resetting content to an IT computing device may include logically coupling password-resetting content to the IT computing device. Validating the password-resetting content on the IT computing device may include confirming that the password-resetting content includes an identifier associated with the IT computing device. The password-resetting content may include third-party-provided content. Validating the password-resetting content on the IT computing device may include one or more of: decrypting at least a portion of the password-resetting content; and confirming the authenticity of at least a portion of the password-resetting content. The password-resetting content may include time-sensitive, password resetting content.

In another implementation, a computer program product resides on a computer readable medium and has a plurality of instructions stored on it. When executed by a processor, the instructions cause the processor to perform operations including coupling password-resetting content to an IT computing device. The password-resetting content is validated on the IT computing device. The password-resetting content is processed to reset one or more passwords associated with the IT computing device.

One or more of the following features may be included. Coupling password-resetting content to the IT computing device may include physically coupling password-resetting content to the IT computing device. Coupling password-resetting content to an IT computing device may include logically coupling password-resetting content to the IT computing device. Validating the password-resetting content on the IT computing device may include confirming that the password-resetting content includes an identifier associated with the IT computing device. The password-resetting content may include third-party-provided content. Validating the password-resetting content on the IT computing device may include one or more of: decrypting at least a portion of the password-resetting content; and confirming the authenticity of at least a portion of the password-resetting content. The password-resetting content may include time-sensitive, password resetting content.

In another implementation, a computing system includes a processor and memory is configured to perform operations including coupling password-resetting content to an IT computing device. The password-resetting content is validated on the IT computing device. The password-resetting content is processed to reset one or more passwords associated with the IT computing device.

One or more of the following features may be included. Coupling password-resetting content to the IT computing device may include physically coupling password-resetting content to the IT computing device. Coupling password-resetting content to an IT computing device may include logically coupling password-resetting content to the IT computing device. Validating the password-resetting content on the IT computing device may include confirming that the password-resetting content includes an identifier associated with the IT computing device. The password-resetting content may include third-party-provided content. Validating the password-resetting content on the IT computing device may include one or more of: decrypting at least a portion of the password-resetting content; and confirming the authenticity of at least a portion of the password-resetting content. The password-resetting content may include time-sensitive, password resetting content.

The details of one or more implementations are set forth in the accompanying drawings and the description below. Other features and advantages will become apparent from the description, the drawings, and the claims.

BRIEF DESCRIPTION OF THE DRAWINGS

FIG. 2A is a front view of the rack-mountable computing device of FIG. 2.

Like reference symbols in the various drawings indicate like elements.

DETAILED DESCRIPTION OF THE PREFERRED EMBODIMENTS

Figure 1:
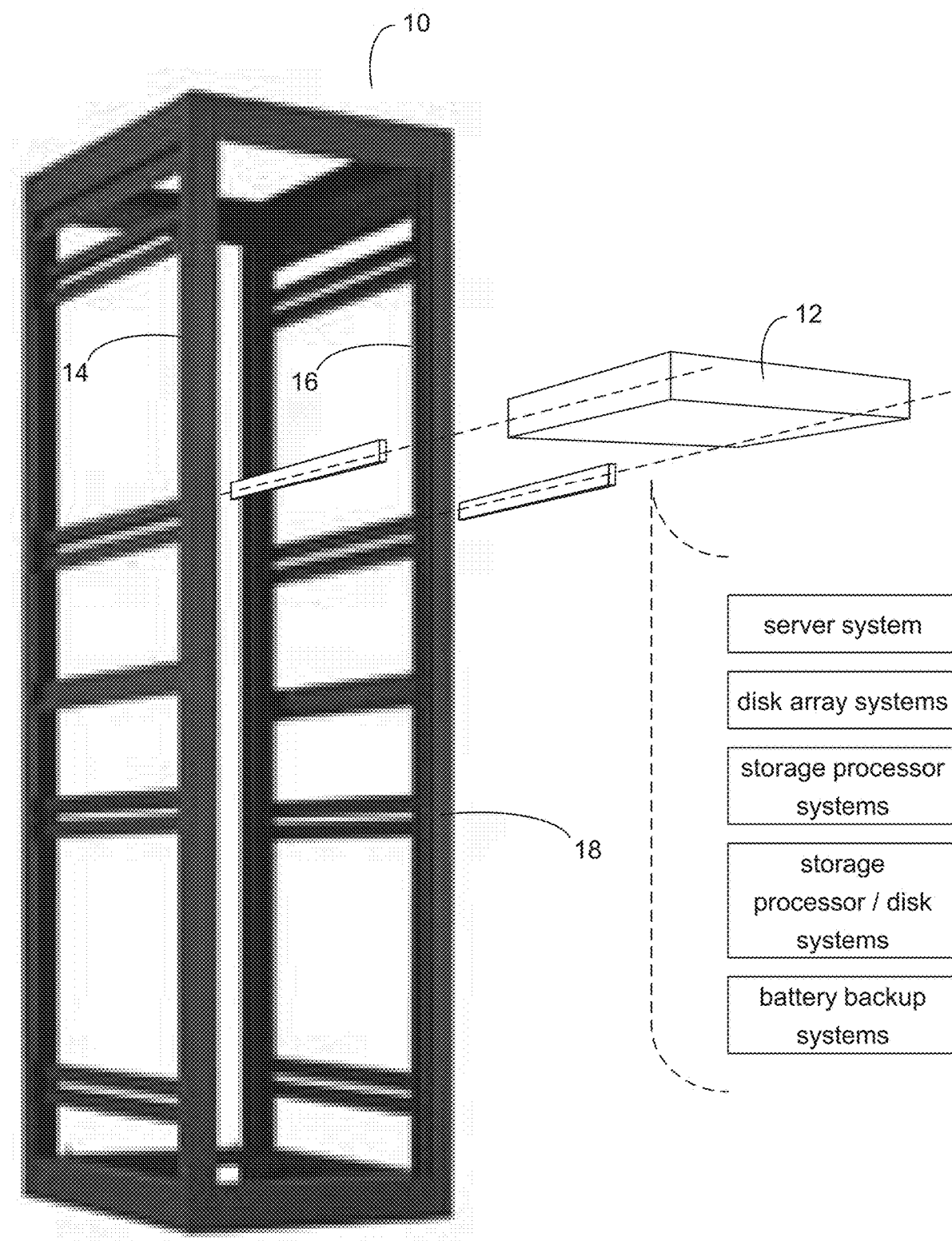
FIG. 1 is a perspective view of an IT rack and an IT component.

Referring to FIG. 1, IT racks (e.g., IT rack 10) may be utilized to store and organize IT components. For example, IT rack 10 may be placed within a computer room and various IT components (e.g., IT component 12) may be attached to rails (e.g., NEMA rails 14, 16) included within IT rack 10, wherein these rails (e.g., NEMA rails 14, 16) may have a standard and defined spacing between them (e.g., 19"). Typically, IT components that are configured to fit within IT rack 10 may be described as rack-mountable components. Examples of the various IT components (e.g., IT component 12) mountable within IT rack 10 may include but are not limited to: server systems, disk array systems, storage processor systems, storage processor/disk systems, and battery backup systems.

IT rack 10 may include frame 18 (which may include one or more vertical supports, horizontal supports, and cross braces) to which NEMA rails 14, 16 may be attached. NEMA rails 14, 16 may include a plurality of evenly spaced holes that may be configured for mounting the various IT components within IT rack 10. By standardizing the spacing between NEMA rails 14, 16, the various IT components that fit within a first IT rack may also fit within a second IT rack.

Typically, IT racks are defined in accordance with the number of rack units (U's) included within the rack. For example, a 1 U IT component is half as high as a 2 U IT component, which is half as high as a 4 U IT component. Accordingly, while the number of rack units available within a particular IT rack may be rigidly defined by the size of the IT rack, the number of IT components mountable within that IT rack may vary depending upon the size (in rack units) of the particular IT components being mounted within that IT rack. Therefore, by reducing the number of rack units that a particular IT component uses within an IT rack, additional IT computing devices may be mounted within the IT rack.

Figure 2:
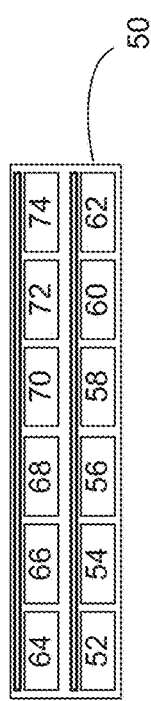
FIG. 2 is a diagrammatic view of a rack-mountable computing device for use within the IT rack of FIG. 1 and a password resetting process.
Figure 2:
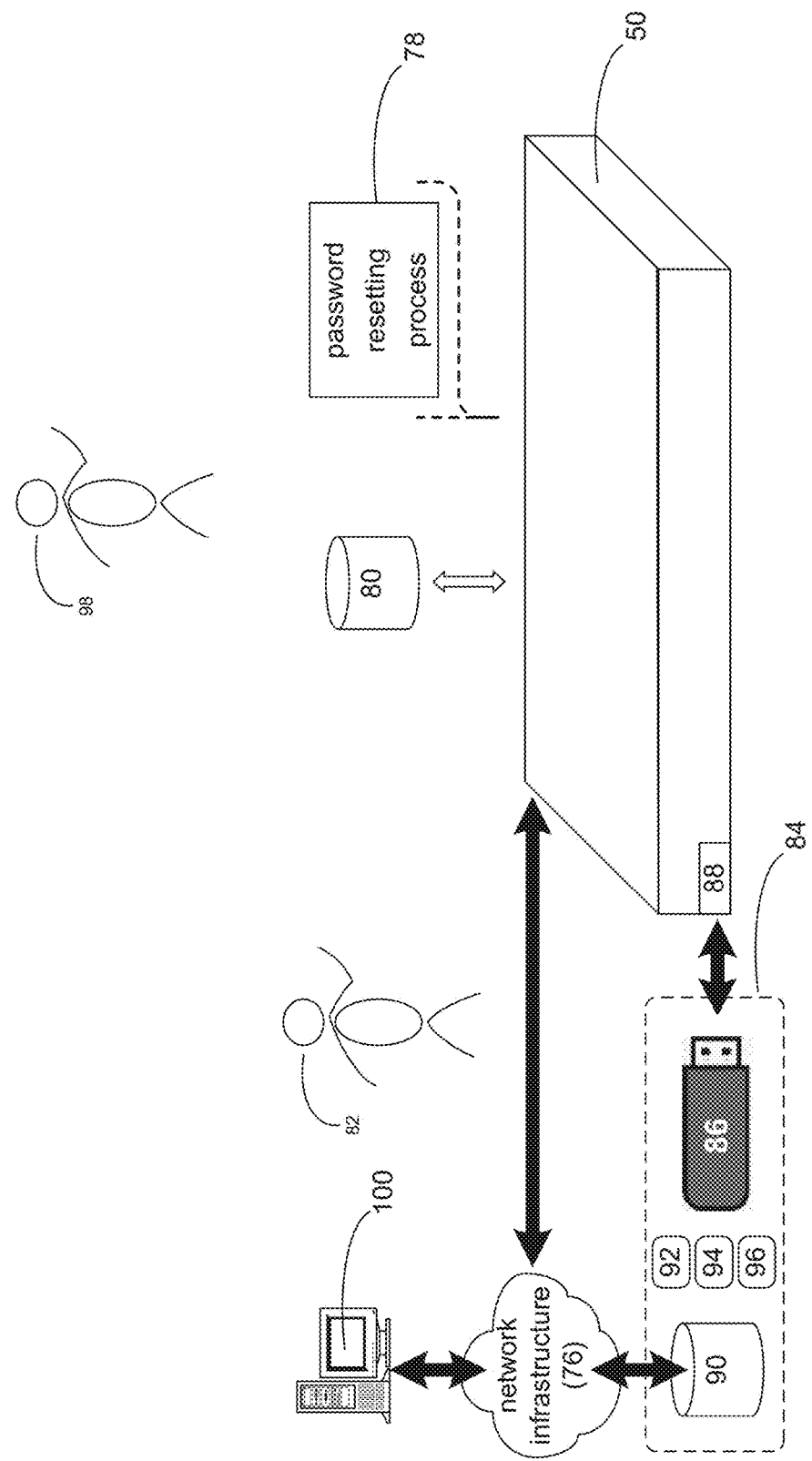

Referring to FIG. 2, there is shown one example of IT component 12, namely rack-mountable computing device 50. In this particular embodiment, rack-mountable computing device 50 may include a plurality of individual components, examples of which may include but are not limited to storage components, input/output components, and processing components, any of which may be a field replaceable unit (FRU) that is serviceable in the field.

Storage components may be the portion of rack-mountable computing device 50 that is configured to store data. Examples of such data may include but are not limited to data that is generated remotely (e.g., by applications that are executed on remote devices) or data that is generated locally (e.g., by applications that are executed on rack-mountable computing device 50). Accordingly, the storage component may be configured to include one or more storage devices, examples of which may include but are not limited to one or more rotating-media disk drives (e.g., SATA drives or SCSI drives) and/or one or more solid state storage devices (e.g., flash drives). For example and as shown in FIG. 2A, the storage component of rack-mountable computing device 50 may be configured to include (in this example) twelve 2.5 inch form factor storage devices (e.g., storage devices 52, 54, 56, 58, 60, 62, 64, 66, 68, 70, 72, 74). Accordingly, these storage devices (e.g., storage devices 52, 54, 56, 58, 60, 62, 64, 66, 68, 70, 72, 74) may be configured to form a RAID array utilizing various standard RAID structures (e.g., RAID 0, RAID 1, RAID 3, RAID 5, RAID 6, RAID 7 or RAID 10), thus providing a higher level of performance and/or availability.

The input/output components of rack-mountable computing device 50 may be the portion of rack-mountable computing device 50 that is configured to couple rack-mountable computing device 50 to a network infrastructure (e.g., network infrastructure 76), wherein network infrastructure 76 may be configured to couple rack-mountable computing device 50 to other rack-mountable computing devices, other IT components (e.g., server systems, disk array systems, storage processor systems, storage processor/disk systems, and battery backup systems), other networking devices (e.g., switches, routers, bridges, wireless access points), and/or end user computing devices (e.g., desktop computers, laptop computers, notebook computers, smartphones, tablet computers, etc.). Examples of network infrastructure 76 may include but are not limited to a local area network; a wide area network; an intranet; an Ethernet infrastructure; a fiber channel infrastructure; and an Infiniband infrastructure.

The processing components of rack-mountable computing device 50 may be the portion of rack-mountable computing device 50 that is configured to process data, such as data that is generated remotely (e.g., by applications that are executed on remote devices) or data that is generated locally (e.g., by applications that are executed on rack-mountable computing device 50). Accordingly, the processing components of rack-mountable computing device 50 may be configured to include one or more microprocessors.

An example of rack-mountable computing device 50 may include a rack-mountable, hyper-converged computing device. As is known in the art, hyper-convergence is a type of infrastructure system with a software-centric architecture that tightly integrates compute, storage, networking and virtualization resources and other technologies in a commodity hardware box supported by a single vendor. A hyper-converged system may allow the integrated technologies to be managed as a single system through a common toolset. Hyper-converged systems may be expanded through the addition of nodes to the base unit. When configured in a hyper-converged fashion, rack-mountable computing device 50 may be quite large and densely packed. Additionally, rack-mountable computing device 50 may be configured in a drawer fashion, wherein rack-mountable computing device 50 includes a fixed portion that may be rigidly affixed to IT rack 10 and a slidable portion that may be configured to slide forward (like a drawer) out of the front of IT rack 10 and away from the fixed portion. Additionally, the slidable portion of rack-mountable computing device 50 may be configured so that the sub-components (e.g., storage devices, compute modules, memory modules) included within rack-mountable computing device 50 may all be accessible and serviceable through the exposed top of the slidable portion once the slidable portion is slid forward and is clear of the fixed portion (as there will typically be another IT device mounted directly on top of rack-mountable computing device 50.

Rack-mountable computing device 50 may execute password resetting process 78. The instruction sets and subroutines of password resetting process 78, which may be stored on storage device 80 coupled to rack-mountable computing device 50, may be executed by one or more processors (not shown) and one or more memory architectures (not shown) included within rack-mountable computing device 50. Storage device 80 may include but is not limited to: a hard disk drive; an optical drive; a RAID device; a random access memory (RAM); a read-only memory (ROM); and all forms of flash memory storage devices.

As discussed above, in order to provide the requisite level of security with respect to electronic content stored within rack-mountable computing device 50, password-protected user accounts may be utilized to gain access to rack-mountable computing device 50 (and the electronic content contained therein). Further and as discussed above, when passwords are forgotten/lost, lack of access to such electronic content may occur (along with the complications related thereto). Accordingly, password resetting process 78 may be configured to allow for administrative access when the normal password-authenticated methods are not available (e.g., when all administrators forget their passwords, have left the company, and/or are not available during an emergency), thus allowing the passwords associated with one or more user accounts (e.g., administrative accounts, service accounts, individual accounts, etc.) to be simply and easily reset.

Assume for illustrative purposes that an administrator (e.g., administrator 82) of rack-mountable computing device 50 may want to reset one or more passwords associated with one or more user accounts of rack-mountable computing device 50. Accordingly, administrator 82 may utilize password resetting process 78 to effectuate the same.

Figure 3:
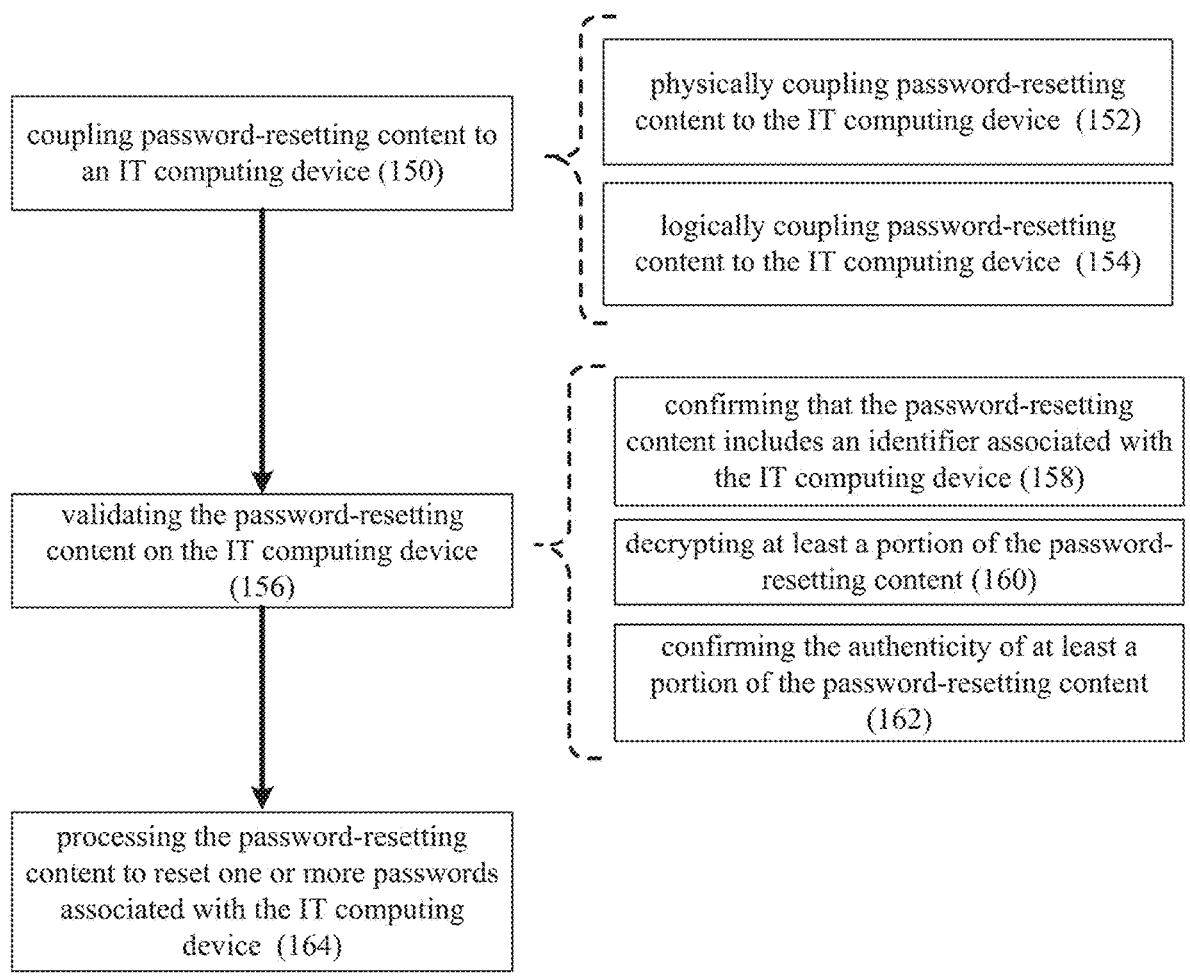
FIG. 3 is a flow chart of one implementation of the password resetting process of FIG. 2.

Accordingly and referring also to FIG. 3, password resetting process 78 may be configured to couple 150 password-resetting content 84 to an IT computing device (e.g., rack-mountable computing device 50). As will be discussed below in greater detail, password resetting content 84 may be utilized by password resetting process 78 to effectuate the resetting of such passwords. For this example, password resetting process 78 may be configured to reset the passwords associated with global administrative user accounts, examples of which may include but are not limited to the password associated with an "admin" account and/or the password associated with a "service" account. However, it is understood that password resetting process 78 may be configured to reset the passwords associated with individual user accounts.

When coupling 150 password-resetting content 84 to the IT computing device (e.g., rack-mountable computing device 50), password resetting process 78 may be configured to physically couple 152 password-resetting content 84 to the IT computing device (e.g., rack-mountable computing device 50). For example, password-resetting content 84 may be included within/stored upon a portable storage device (e.g., removable drive 86) and may be physically coupled 152 to rack-mountable computing device 50, thus enabling password-resetting content 84 to be utilized by password resetting process 78. For example, removable drive 86 may be configured to be inserted into e.g., USB port 88 of rack-mountable computing device 50. Accordingly and upon such insertion, password resetting process 78 may scan removable drive 86 so that password-resetting content 84 included within removable drive 86 may be located, obtained and processed by password resetting process 78.

Additionally/alternatively, when coupling 150 password-resetting content 84 to the IT computing device (e.g., rack-mountable computing device 50), password resetting process 78 may be configured to logically couple 154 password-resetting content 84 to the IT computing device (e.g., rack-mountable computing device 50). For example, password-resetting content 84 may be included within/stored upon a logical mountable volume (e.g., volume 90) and may be logically coupled 154 to rack-mountable computing device 50 via network infrastructure 76, thus enabling password-resetting content 84 to be utilized by password resetting process 78. For example, volume 90 may be configured to be a mountable/accessible volume that is accessible by rack-mountable computing device 50. Accordingly and upon volume 90 being mounted/accessed, password resetting process 78 may scan volume 90 so that password-resetting content 84 included within volume 90 may be located, obtained and processed by password resetting process 78.

Password-resetting content 84 may be configured to include various discrete components. For example, password-resetting content 84 may include an identifier component (e.g., identifier file 92) that may identify the IT computing device (e.g., rack-mountable computing device 50) for which password-resetting content 84 is intended to be used. For example, identifier 92 may include a unique identifier (e.g., a serial number, a service tag number, etc.) that may uniquely associate password-resetting content 84 with (in this example) the IT computing device (e.g., rack-mountable computing device 50).

As discussed above, password-resetting content 84 may be configured to include various discrete components. Additionally and as discussed above, password resetting process 78 may be configured to reset the passwords associated with one or more user accounts, examples of which may include but are not limited to the password associated with global administrative user accounts and/or individual user accounts. Accordingly, password-resetting content 84 may include a reset component (e.g., reset file 94) that may be utilized by password resetting process 78 to reset the password associated with the intended user account. Assume for this example that password-resetting content 84 is configured to reset the password associated with the "admin" account of the IT computing device (e.g., rack-mountable computing device 50). Accordingly and in this example, password-resetting content 84 may include reset file 94 that is configured to reset the password associated with the "admin" account. Therefore, reset file 94 may define the username (e.g., "admin") for which the password is being reset and the default password (e.g., "ABC123") to which the password is being reset.

Password resetting process 78 may be configured to validate 156 password-resetting content 84 on the IT computing device (e.g., rack-mountable computing device 50). For example and as discussed above, password-resetting content 84 may include an identifier component (e.g., identifier file 92) that may identify the IT computing device (e.g., rack-mountable computing device 50) for which password-resetting content 84 is intended to be used.

Accordingly and when validating 156 the password-resetting content on the IT computing device, password resetting process 78 may be configured to confirm 158 that password-resetting content 84 includes an identifier associated with the IT computing device (e.g., rack-mountable computing device 50). For example, password resetting process 78 may compare the unique identifier (e.g., a serial number, a service tag number, etc.) defined within identifier 92 to the appropriate information (e.g., the serial number, the service tag number, etc.) of rack-mountable computing device 50 to determine e.g., whether or not there is a match. In the event that there is a match, password resetting process 78 may confirm 158 that password-resetting content 84 includes an identifier associated with the IT computing device (e.g., rack-mountable computing device 50). In the event that there is not a match, password resetting process 78 may fail to validate 156 password-resetting content 84 for the IT computing device (e.g., rack-mountable computing device 50), thus resulting in password-resetting content 84 being rejected by password resetting process 78. Such a rejection may occur when e.g., password-resetting content 84 was coupled 150 to the wrong IT computing device.

As will be discussed below in greater detail, password-resetting content 84 may include third-party-provided content (e.g., third-party content 96), an example of which may include but is not limited to time-sensitive, password resetting content.

For example and in the event that a higher level of security is desired with respect to resetting passwords associated with one or more user accounts of the IT computing device (e.g., rack-mountable computing device 50), administrator 82 may be required to contact third party 98 to obtain such third-party-provided content (e.g., third-party content 96). Examples of third party 98 may include but are not limited to: a manufacturer of rack-mountable computing device 50, a reseller of rack-mountable computing device 50, or an IT supervisor of rack-mountable computing device 50.

Password resetting process 78 may be configured to allow/require administrator 82 to contact third-party 98 via a telephone (not shown), a text messaging application (not shown), a API/web portal (not shown), or a specialized application (not shown). During such contact with third-party 98, administrator 82 may be required to provide identity authenticating information (e.g., serial number, service tag, legal name, username, password, etc.).

In the event that administrator 82 contacts third-party 98 via a telephone, third party 98 may be verbally provided with a reset code (e.g., third-party content 96). Alternatively and when administrator 82 contacts third-party 98 via a telephone, third party 98 may provide administrator 82 with third-party content 96 via e.g., an email attachment. Additionally and when administrator 82 contacts third-party 98 electronically (e.g., via the text messaging application, the API/web portal, or the specialized application), third party 98 may provide administrator 82 with third-party content 96 via some form of electronic communication.

As will be discussed below in greater detail and in order to provide a higher level of security, third-party content 96 provided to administrator 82 may be encrypted by third party 98. According and when validating 156 password-resetting content 84 on the IT computing device (e.g., rack-mountable computing device 50), password resetting process 78 may decrypt 160 at least a portion of password-resetting content 84.

One example of such encryption may include but is not limited to private key/public key encryption. As is known in the art, a private key/public key encryption methodology may allow users of an unsecure network (e.g., the Internet) to securely exchange data through the use of a pair of encryption keys, namely a private encryption key and a public encryption key. The private key/public key encryption methodology is typically referred to as an asymmetric encryption methodology, in that the key used to encrypt a message is different than the key used to decrypt the message. In private key/public key encryption, the private encryption key and the public encryption key are typically created simultaneously using the same algorithm (e.g., the RSA algorithm created by Ron Rivest, Adi Shamir, and Leonard Adleman, for example). The private encryption key may be given only to the requesting party and public encryption key may be made publicly available (e.g., as part of a digital certificate). Typically, the private encryption key is not shared and is maintained securely by the owner of the private encryption key.

Accordingly, when secure content (e.g., third-party content 96) is to be sent from a sender (e.g., third party 98) to a recipient (e.g., administrator 82), the public encryption key of administrator 82 (which is readily accessible to third party 98) may be used to encrypt third-party content 96. Once encrypted, third-party content 96 may be sent from third party 98 to administrator 82 and may only be decrypted using the private encryption key of the administrator. As the private encryption key is maintained securely by administrator 82, only administrator 82 may be able to decrypt 160 third-party content 96 (i.e., at least a portion of password-resetting content 84).

As will be discussed below in greater detail and in order to provide a higher level of security, third-party content 96 provided to administrator 82 may be digitally secured by third party 98. Accordingly and when validating 156 password-resetting content 84 on the IT computing device (e.g., rack-mountable computing device 50), password resetting process 78 may confirm 162 the authenticity of at least a portion of password-resetting content 84.

One example of a method of digitally securing may include but is not limited to utilizing a digital signature. As is known in the art, in addition to encrypting and decrypting third-party content 96, a sender (e.g., third party 98) may authenticate their identity by using their private encryption key to encrypt a digital certificate (not shown), which may then be made available to a recipient (e.g., administrator 82) via e.g., a trusted Certificate Authority (CA). Accordingly, when the encrypted digital certificate (not shown) is received by administrator 82, administrator 82 may decrypt the encrypted digital certificate (not shown) using the public encryption key of third party 98, thus verifying that the digital certificate (not shown) was encrypted using the private encryption key and confirming 162 the authenticity of third-party content 96 (i.e., at least a portion of password-resetting content 84).

Once password-resetting content 84 is properly configured, password resetting process 78 may process 164 password-resetting content 84 to reset one or more passwords associated with the IT computing device (e.g., rack-mountable computing device 50).

For example, administrator 82 may utilize a computer/console (e.g., computer 100) and password resetting process 78 to configure password-resetting content 84, wherein computer 100 may be coupled to network infrastructure 76. For example and via computer 100, administrator 82 may configure removable drive 86 and/or may configure volume 90. Accordingly, administrator 82 may define the identity of the IT computing device (e.g., rack-mountable computing device 50) on which a password is to be reset within identifier 92. Accordingly, identify 92 may define the serial number/service tag of the IT computing device (e.g., rack-mountable computing device 50), wherein identifier 92 may be placed onto removable drive 86 and/or volume 90.

Additionally and via computer 100 and password resetting process 78, administrator 82 may define the one or more usernames (e.g., "admin") for which passwords will be reset, wherein these usernames may be defined within reset file 94. Reset file 94 may further define the default password (e.g., "ABC123") to which the password is being reset.

Additionally and via computer 100 and password resetting process 78, administrator 82 may obtain third-party content 96 from third party 98, which (as discussed above) may be encrypted and/or digitally secured. Once obtained, third-party content 96 may be placed onto removable drive 86 and/or volume 90.

Once password-resetting content 84 is configured, password-resetting content 84 may be processed 164 by password resetting process 78 to reset one or more passwords associated with the IT computing device (e.g., rack-mountable computing device 50). For example, password resetting process 78 may process 164 reset file 94 to reset the appropriate password to their default value. Password resetting process 78 may further process 164 third-party content 96. As discussed above, an example of third-party content 96 may include but is not limited to time-sensitive, password resetting content. For example, third-party content 96 may include a time sensitive reset code, wherein password resetting process 78 may be configured to accept such a time sensitive reset code for only a defined period of time (e.g., 90 minutes) after third-party content 96 is generated.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    coupling password-resetting content to an IT computing device, wherein coupling password-resetting content to the IT computing device includes logically coupling password-resetting content to a volume within the IT computing device via a network infrastructure, and wherein the IT computing device includes one or more storage components configured to include one or more storage devices, wherein the one or more storage devices are configured to form a RAID configuration;
    validating the password-resetting content on the IT computing device, wherein validating the password-resetting content on the IT computing device includes:
        confirming that the password-resetting content includes an identifier associated with the IT computing device; and
    processing the password-resetting content to reset one or more passwords associated with the IT computing device, wherein processing the password-resetting content to reset the one or more passwords associated with the IT computing device includes utilizing a computing device to identify the IT computing device and to define the one or more usernames of a plurality of usernames for which the passwords will be reset, wherein the password-resetting content includes a reset component, wherein the reset component includes a reset file configured to reset the one or more passwords associated with one or more user accounts, wherein the password-resetting content includes third-party-provided content, wherein the third-party provided content includes a time sensitive reset code configured to expire if not used within a defined period of time to reset the one or more passwords associated with the IT computing device.

2. The computer-implemented method of claim 1 wherein coupling password-resetting content to the IT computing device includes:
    physically coupling password-resetting content to the IT computing device.

3. The computer-implemented method of claim 1 wherein validating the password-resetting content on the IT computing device includes one or more of:
    decrypting at least a portion of the password-resetting content; and
    confirming the authenticity of at least a portion of the password-resetting content.

4. The computer-implemented method of claim 1 wherein the password-resetting content includes time-sensitive, password resetting content.

5. The computer-implemented method of claim 1, wherein confirming that the password-resetting content includes the identifier associated with the IT computing device includes comparing an identifier component of the password-resetting content to the identifier associated with the IT computing device to effectuate determining a match between the identifier component of the password-resetting content and the identifier associated with the IT computing device.

6. The computer-implemented method of claim 5, wherein comparing the identifier component of the password-resetting content to the identifier associated with the IT computing device includes determining that the identifier component of the password-resetting content and the identifier associated with the IT computing device do not match and subsequently rejecting the password-resetting content.

7. The computer-implemented method of claim 5, wherein the identifier component of the password-resetting content includes at least one of a serial number and a service tag number.

8. The computer-implemented method of claim 1, wherein processing the password-resetting content to reset the one or more passwords associated with the IT computing device includes processing the reset file to reset each of the one or more passwords to a default value.

9. A computer program product residing on a non-transitory computer readable medium having a plurality of instructions stored thereon which, when executed by a processor, cause the processor to perform operations comprising:
    coupling password-resetting content to an IT computing device, wherein coupling password-resetting content to the IT computing device includes logically coupling password-resetting content to a volume within the IT computing device via a network infrastructure, and wherein the IT computing device includes one or more storage components configured to include one or more storage devices, wherein the one or more storage devices are configured to form a RAID configuration;
    validating the password-resetting content on the IT computing device, wherein validating the password-resetting content on the IT computing device includes:
        confirming that the password-resetting content includes an identifier associated with the IT computing device; and
    processing the password-resetting content to reset one or more passwords associated with the IT computing device, wherein processing the password-resetting content to reset the one or more passwords associated with the IT computing device includes utilizing a computing device to identify the IT computing device and to define the one or more usernames of a plurality of usernames for which the passwords will be reset, wherein the password-resetting content includes a reset component, wherein the reset component includes a reset file configured to reset the one or more passwords associated with one or more user accounts, wherein the password-resetting content includes third-party-provided content, wherein the third-party provided content includes a time sensitive reset code configured to expire if not used within a defined period of time to reset the one or more passwords associated with the IT computing device.

10. The computer program product of claim 9 wherein coupling password-resetting content to the IT computing device includes:
    physically coupling password-resetting content to the IT computing device.

11. The computer program product of claim 9 wherein validating the password-resetting content on the IT computing device includes one or more of:

decrypting at least a portion of the password-resetting content; and confirming the authenticity of at least a portion of the password-resetting content.

12. The computer program product of claim 9 wherein the password-resetting content includes time-sensitive, password resetting content.

13. A computing system including:

a memory; and a processor configured to perform operations comprising:

coupling password-resetting content to an IT computing device, wherein coupling password-resetting content to the IT computing device includes logically coupling password-resetting content to a volume within the IT computing device via a network infrastructure, and wherein the IT computing device includes one or more storage components configured to include one or more storage devices, wherein the one or more storage devices are configured to form a RAID configuration;

validating the password-resetting content on the IT computing device, wherein validating the password-resetting content on the IT computing device includes:

confirming that the password-resetting content includes an identifier associated with the IT computing device; and processing the password-resetting content to reset one or more passwords associated with the IT computing device, wherein processing the password-resetting content to reset the one or more passwords associated with the IT computing device includes utilizing a computing device to identify the IT computing device and to define the one or more usernames of a plurality of usernames for which the passwords will be reset, wherein the password-resetting content includes a reset component, wherein the reset component includes a reset file configured to reset the one or more passwords associated with one or more user accounts, wherein the password-resetting content includes third-party-provided content, wherein the third-party provided content includes a time sensitive reset code configured to expire if not used within a defined period of time to reset the one or more passwords associated with the IT computing device.

14. The computing system of claim 13 wherein validating the password-resetting content on the IT computing device includes one or more of:

decrypting at least a portion of the password-resetting content; and confirming the authenticity of at least a portion of the password-resetting content.

15. The computing system of claim 13 wherein the password-resetting content includes time-sensitive, password resetting content.

* * * * *